United States Patent [19]

Guest

[11] Patent Number: 4,637,636
[45] Date of Patent: Jan. 20, 1987

[54] TUBE COUPLINGS

[76] Inventor: John D. Guest, "IONA", Cannon Hill Way, Bray, Maidenhead, Berkshire, United Kingdom

[21] Appl. No.: 793,004

[22] Filed: Oct. 30, 1985

[30] Foreign Application Priority Data

Nov. 12, 1984 [GB] United Kingdom ............... 8428532
Apr. 4, 1985 [GB] United Kingdom ............... 8508943

[51] Int. Cl.$^4$ ............................................. F16L 35/00
[52] U.S. Cl. ......................................... 285/38; 285/39;
285/179; 285/323; 285/351; 285/369; 285/383;
285/423
[58] Field of Search ............... 285/322, 323, 341, 348,
285/38, 39, 179, 351, 369, 383, 423

[56] References Cited

U.S. PATENT DOCUMENTS 3,909,046 9/1975 Legris ........................... 285/323 X
4,183,560 1/1980 Wyss ............................. 285/348 X

FOREIGN PATENT DOCUMENTS

807736 7/1951 Fed. Rep. of Germany ...... 285/322
2,413,750 11/1974 Fed. Rep. of Germany ...... 285/323
2853726 6/1980 Fed. Rep. of Germany ...... 285/348

Primary Examiner—Dave W. Arola
Attorney, Agent, or Firm—Beveridge, DeGrandi & Weilacher

[57] ABSTRACT

The disclosure relates to tube couplings in which a hollow body (10) has an opening (11) to receive a tube (15) and a collet (32) having resilient arms encircling the tube in the body to grip the tube. An annular cam (22) is mounted in the body and has a tapered internal cam surface (31) engaged by the collet arms (33) which reduces towards the open end of the body to increase compression of the arms against the tube as the collet is drawn towards the open end of the body to lock the tube in the body. The cam member (27) is mounted in the body for axial adjustment with respect to the body, for example by a screw engagement (28) in the body, to enable the cam to be adjusted with respect to the collet to vary the compressive force applied to the resilient arms.

9 Claims, 10 Drawing Figures

TUBE COUPLINGS

BACKGROUND OF THE INVENTION

1. Field of the Invention

This invention relates to tube couplings for connection of a tube (whether plastics or metal) to a component, a body member or to another tube.

2. Description of the Prior Art

U.K. Patent Specification No. 1 520 742 describes and illustrates a tube coupling comprising a hollow body having an opening to recieve a tube to be coupled therewith, a collet having an annular portion and resilient arms extending from the annular portion into the hollow body, a cam member in the body and having an internal tapered cam surface reducing in a direction extending out of the body and with which the resilient arms of the collet are engageable to be compressed thereby into engagement with the tube in the collet to clamp the collet in the body. Couplings of that type have been widely used and are entirely satisfactory in most applications. However such couplings do have a limited range over which the resilient arms can be compressed by engagement with the cam and may not therefore be entirely satisfactory for gripping very soft tubing where extra inward movement of the resilient arms is required to take up the deflection of the soft wall of the tube and also in the case where the tube external diameter differs considerably from the nominal value for which the coupling was intended.

SUMMARY OF THE INVENTION

The invention provides a tube coupling comprising a hollow body having an opening to receive a tube to be coupled therewith, a collet having an annular portion and resilient arms extending from the annular portion into the hollow body, a cam member mounted on the body and having an internal tapered cam surface reducing in a direction extending out of the body and with which the resilient arms of the collet are engageable to be compressed thereby into engagement with the tube in the collet, the collet being axially movable in either direction with respect to the cam member to increase or decrease the clamping action of the cam on the resilient arms against a tube encircled by the arm and the means to adjust the cam on the body with respect to the collet to vary additionally the compressive force applied by the cam surface of the cam to the collet and thereby adjust the compressive force applied by the resilient arms to a tube within the collet.

The cam member may have an external screw thread engageable in an internal screw thread in the hollow body for adjustment of the cam member with respect to the collet and means are provided on the cam member projecting outwardly of an open end of the body for turning the cam member to effect said adjustment.

More specifically the cam member may have an annular flange projecting outwardly from the open end of the body with a roughened outer surface to enable the flanged to be gripped for screwing the cam member with respect to the body to effect said adjustment.

In any of the above arrangements a sealing ring or rings may be mounted in the body to seal with the outer surface of the tube to be inserted into the body.

More specifically the sealing ring or rings may be trapped by a shoulder in the hollow body facing towards the open end thereof and the ends of the resilient arms of the collet.

In accordance with a further feature a floating ring may be disposed between the sealing rings and the resilient arms, the ring having side faces which converge towards the inner periphery of the ring with which the sealing ring and ends of the resilient arms respectively engage.

In any of the above arrangements and where the cam member is screwed into the hollow body, the hollow body may be formed with an insert sleeve carrying an internal screw thread with which the extenal screw thread on the cam member is engageable.

More specifically the insert sleeve may have a radially inwardly extending flange at the inner end thereof having an inclined face around its inner periphery tapering in the inward direction of the body and with which the resilient arms are engageable to urge the arms inwardly into engagement with the tube located within the collet.

DESCRIPTION OF THE PREFERRED EMBODIMENTS

Figure 1:
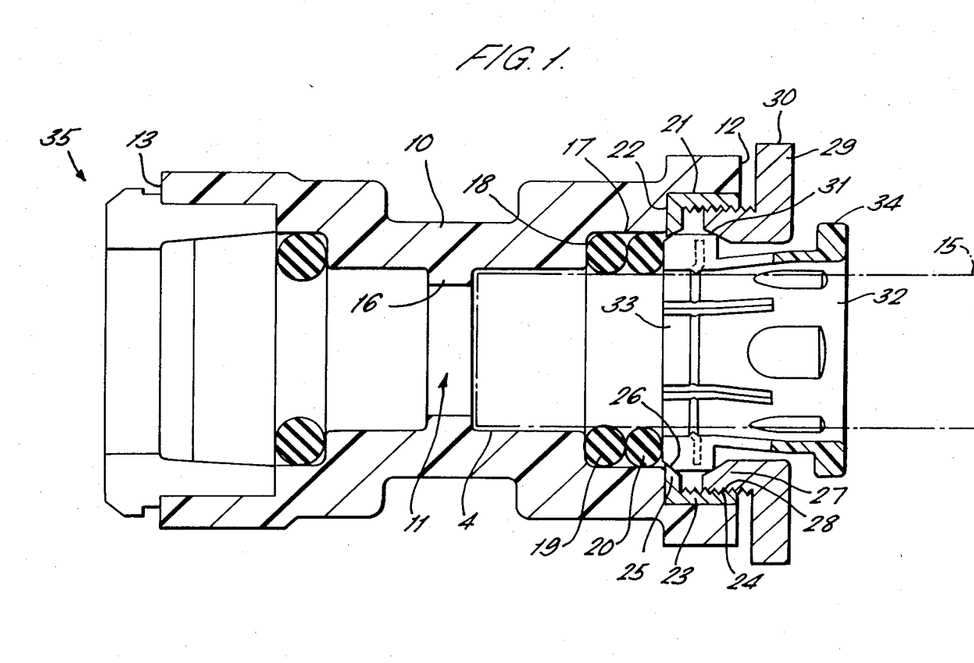
FIG. 1 is a partly sectioned diagrammatic view of a tube coupling.

Referring firstly to FIG. 1 of the drawings, there is shown a double ended coupling suitable, for example, for connecting two lengths of pipe together, for example a length of plastic piping to a length of stainless steel tubing. The coupling comprises a generally cylindrical from plastics body 10 having a throughway 11 extending between opposite ends 12, 13 of the body in which couplings are provided for receiving and locking tubes in the body.

The throughway 11 is formed with a main bore 14 to receive and end part of tubes 15 (only one of which is shown) inserted into the body. At the centre of the bore 14 there is a raised shoulder 16 and tubes 15 inserted from either end of the coupling located against either side of the shoulder. To the right hand side of the shoulder 16 as viewed in the drawing, a first counter bore 17 is formed partway along the bore 14 connected to the main bore 14 by a shoulder 18 to receive two resilient O-ring seals 19, 20 located side-by-side in the counter bore to engage and seal with the outer surface of the tube 15. The counter bore 17 gives way to a second counter bore 21 connected to the counter bore 17 by an annular shoulder 22, the counter bore 21 extending to the end 12 of the body.

The body 10 is an injection plastics moulding and a brass or other material sleeve 23 formed with a fine internal screw thread 24 and a radially inwardly extending flange 25 at the end of the sleeve remote from the end 12 of the body to lie against the shoulder 22. The inner edge of the flange 25 is angled as indicated at 26 to provide a taper in the direction leading into the throughway.

A cam member 27 in the form of an annular sleeve has an external screw thread 28 to engage in the screw thread 24 in the sleeve and has an out-turned flange 29 at an end of the cam member projecting out of the throughway. The cam is formed from brass or other metal similar to that used for the sleeve 23 and the roughened surface provided on the edge 30 of the flange 29 permits the cam member to be readily rotated by hand with respect to the sleeve.

The internal surface of the cam member is formed with a tapered cam surface 31 which converges towards the open end of the throughway. A collet 32 is disposed within the end of the throughway and has a plurality of resilient arms 33 projecting into the throughway. The arms have projection on their inner sides which may be formed with metal inserts to engage and grip the outer surface of a tube 15 inserted through the collet. The ends of the resilient arms bear against the O-ring seal 20 and the outer surfaces of the arms are engageable with the converging cam surface 31 on the cam member. The part of the collet projecting out of the throughway beyond the cam member 27 is formed with an out-turned flange 34 to enable the collet to be adjusted manually with respect to the tube.

When a tube such as a stainles steel tube is inserted in the throughway through the collet and sealing rings 19, 20 into engagement with the shoulder 16, the resilient arms 33 of the collet will engage the tube and any attempt to withdraw the tube will cause the resilient arms to be forced with an increasing pressure into gripping engagement with the tube by the action of the converging cam surface 31 on the resilient arm thus preventing the tube from being extracted from the throughway. If of course it is required to extract the tube, the collet can be pressed forwardly against the sealing rings manually by engaging the flange 34 and, when held in that condition, the tube can be withdrawn.

The gripping action of the resilient arms on the tube through the action of the cam surface 31 can be increased by screwing the cam member 27 further into the screw threaded sleeve 23 by manually rotating the flange 29 of the cam member. As the cam member is screwed further and further into the sleeve, so the converging cam surface 31 of the cam member slides over the resilient arms 33 increasing the compressive force applied by the cam surface to the resilient arms and thereby the resilient arms to the tube within the collet to increase the gripping action of the resilient arms on the tube. Likewise, by screwing the cam member outwardly of the sleeve 23 the gripping action of the resilient arms on the tube is reduced.

Figure 2:
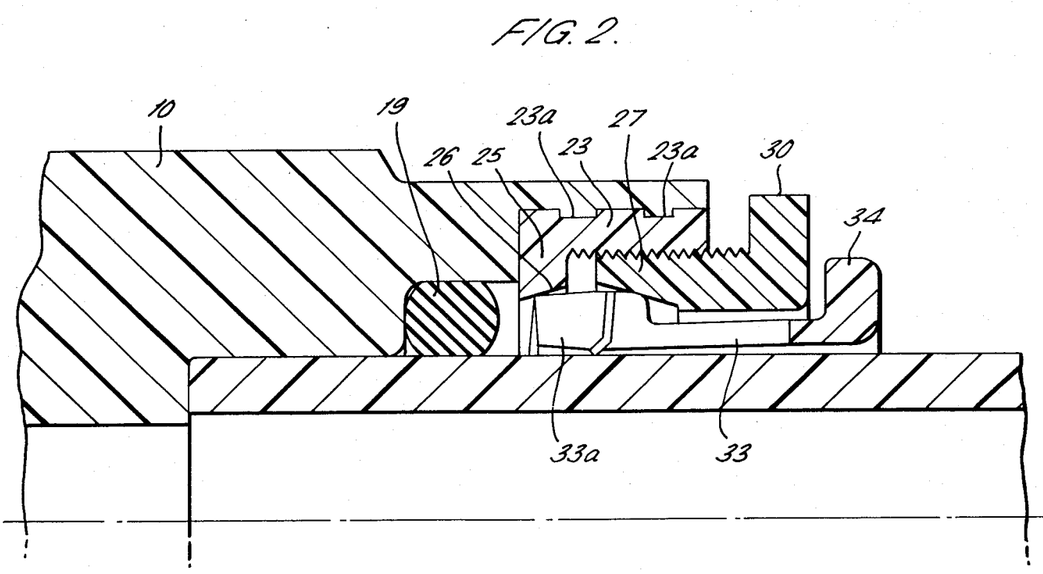
FIGS. 2 to 7 are part sections illustrating a number of modifications to the tube coupling of FIG. 1.

Referring now to FIG. 2 of the drawings, the arrangement shown is generally similar to that of FIG. 1 except that only a single O-ring seal 19 is mounted in the counter-bore 17 and in that the heads 33a at the ends of the resilient arms 33 of the collet are formed with a shallow tapering surface to bear against the convergent face 26 on the in-turned flange 25 as opposed to the sharply angled corner on the heads of the previous arrangement. The shallow taper assists in pressing the heads 33a inwardly as the cam member 27 is tightened into the outer sleeve 23. Also the outer sleeve 23 is formed with peripheral grooves 23a into which the encircling wall of the body 10 is "keyed" to lock the sleeve in the end of the body. The arrangement is otherwise similar to that described above.

Figure 3:
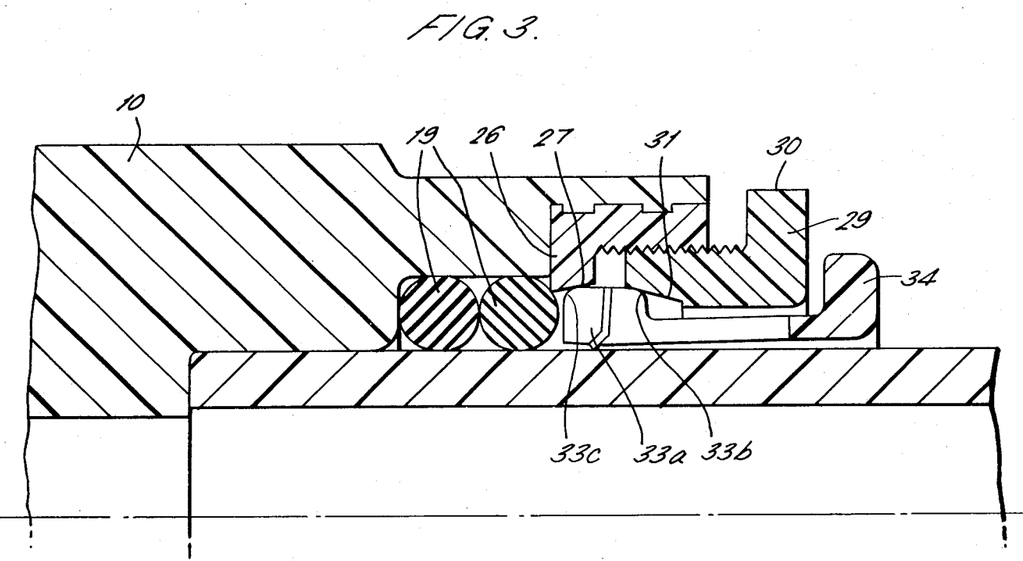

FIG. 3 shows some modifications of the arrangement of FIG. 2 comprising the provision of two O-ring seals 19 in place of the single seal of the arrangement of FIG. 2. The heads 33 of the resilient arms on the collet are somewhat shorter and have round outer ends 33b and 34c to engage respectively the tapered cam 31 and angled face 27 of the flange 26. The arrangement is otherwise similar to that described above.

Figure 4:
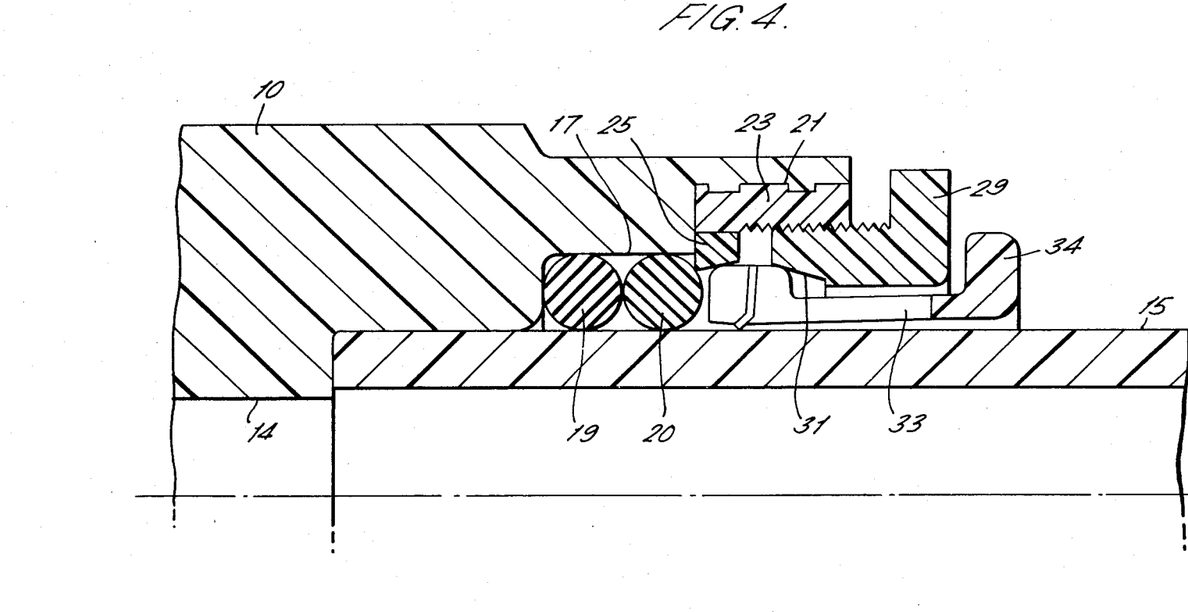

FIG. 4 shows a further modification to the arrangement of FIG. 3 in which the inturned flange 25 at the inner end of the sleeve 23 is formed is a separate internal washer rather than an integral element of the sleeve. The arrangement is otherwise similar to that described above.

Figure 5:
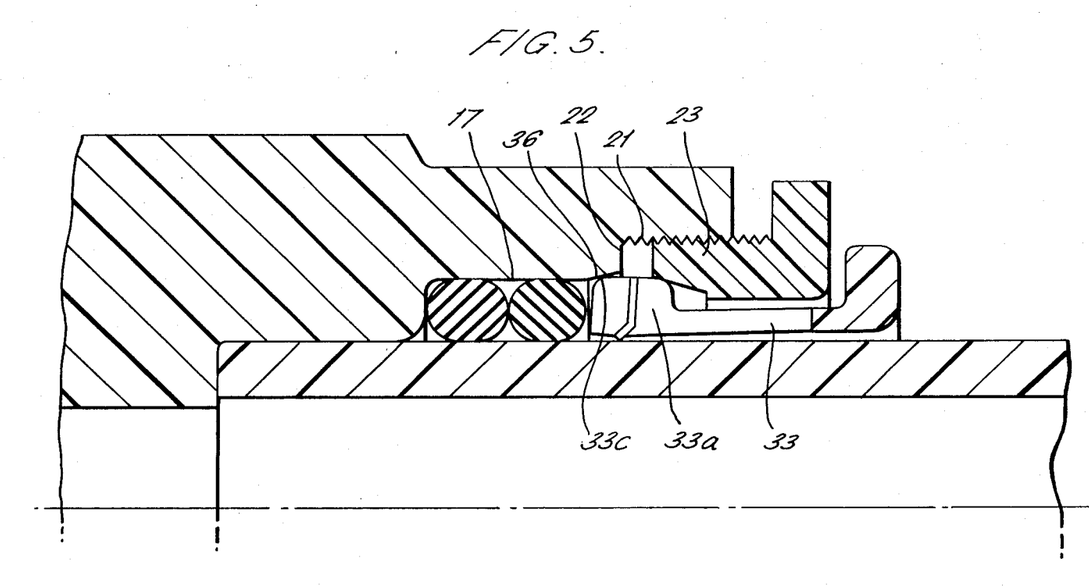

FIG. 5 shows a further modification in which the separate insert sleeve 25 is dispensed with and the counter-bore 21 is formed with an internal screw thread with which the external thread of the cam engages. The end part of the counter-bore 17 is flared at the end of the counter-bore adjacent the step 22 to provide a convergent cam face 36 against which the outer corner 33c of the heads of the resilient arms engage in place of the angled face 26 on flange 25 of the previous arrangement.

Figure 6:
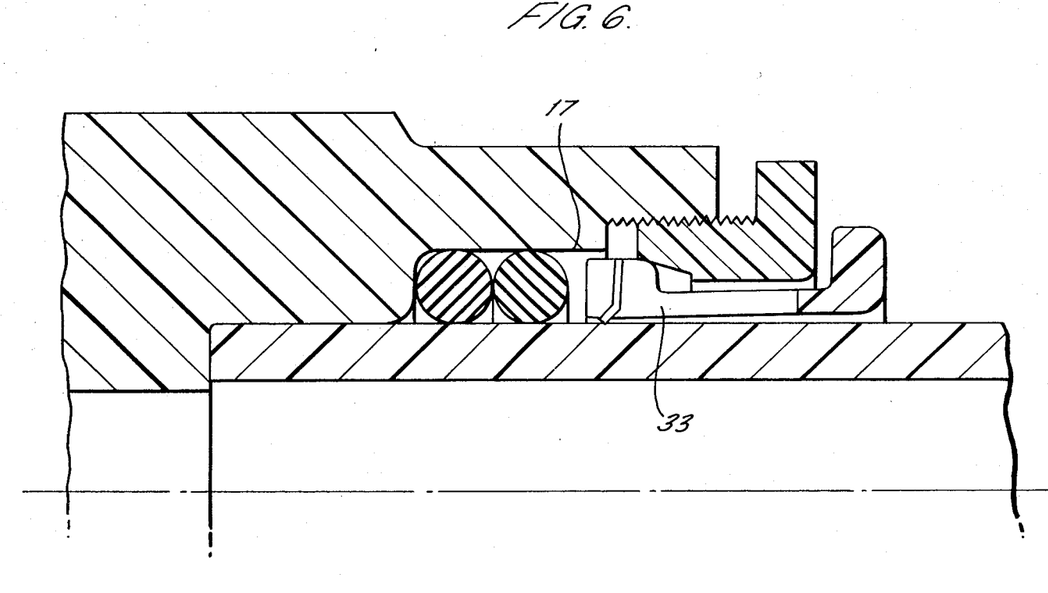

FIG. 6 shows a further simplification in which a tapering cam surface 36 at the entry to the counter-bore 17 is omitted and the heads 33 on the resilient arms are dimensioned to extend into the counter-bore 17.

Figure 7:
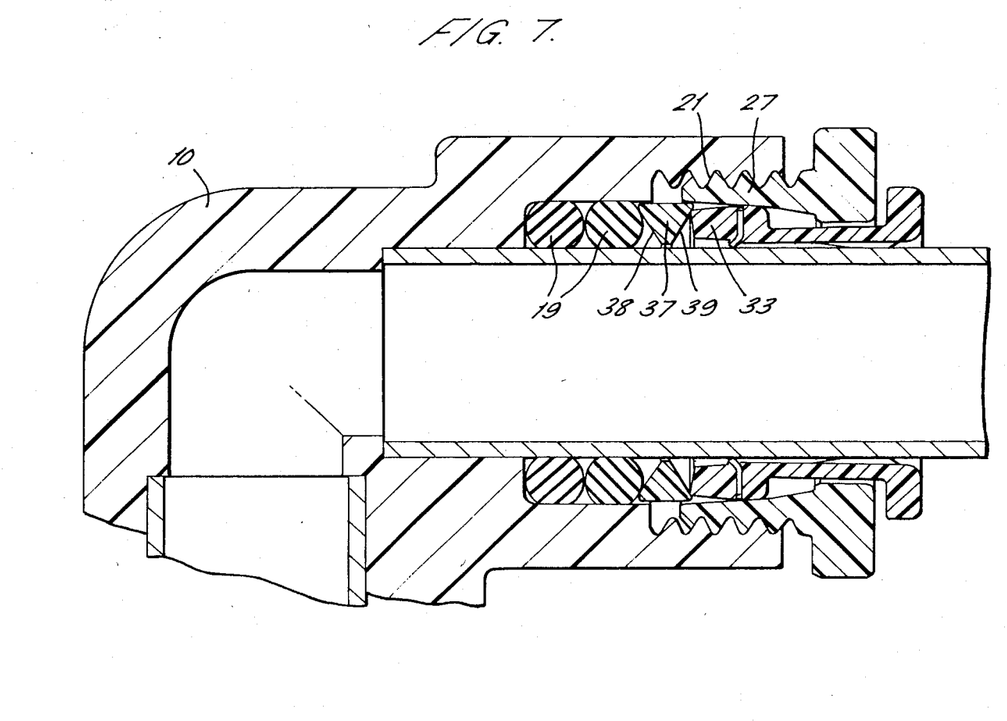

FIG. 7 shows a modification to the arrangement of FIG. 6 in which an insert ring 37 is disposed between the ends of the heads 33 of the collet and the sealing rings 19. The ring has side faces 38, 39 which converge towards the inner periphery of the ring to bear against the adjacent O-ring seal 19 and the adjacent ends of the heads of the collet respectively. The angled face 39 engaging the heads of the collet serves to hold the collet end and prevents distortion when the collet engages with the inclined cam face of the encircling cam member 27, FIG. 7 also shows a coarse form of screw thread between the cam member 27 and counter-bore 21 in the body 10.

It will be appreciated that many modifications may be made to the above embodiments. For example the metal insert sleeve could be formed integrally in plastics with the body member and the cam member 27 can also be formed from plastics.

The coupling at the other end of the body member may be similar to that described above or may be of the form described and illustrated in U.K. Pat. No. 1520742 or any of the modified forms of that coupling described and illustrated in U.K. Patent Publication Nos. 1573757, 2007322, 2051280, 2052662, 2132295, 2131903, 8319717, 8425681, 8331191 or 8214432.

Figure 8:
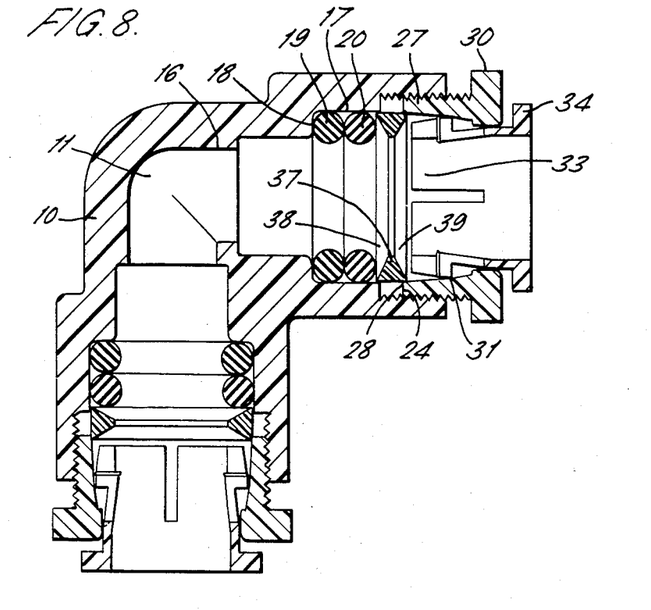
FIG. 8 is a sectional view through a futher form of coupling.

The invention is equally applicable to elbow or other forms of joint and is applicable to single tube couplings as well as double tube couplings such as that described above. FIG. 8 illustrates, by way of example, a double tube coupling of elbow form.

Figure 9:
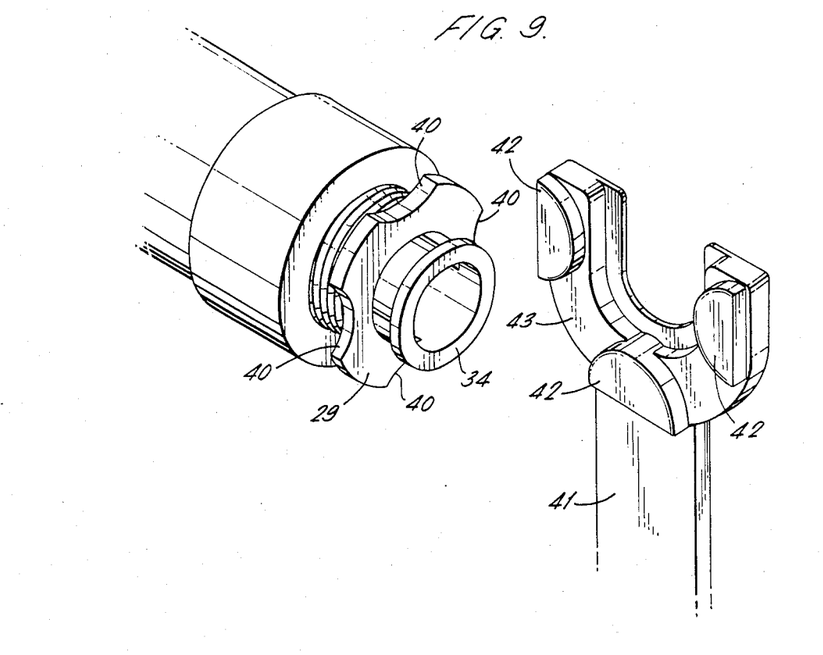
FIG. 9 is a perspective view of an end part of a coupling adapted for adjustment by a special form of tool; an FIG. 10 shows the tool.
Figure 10:
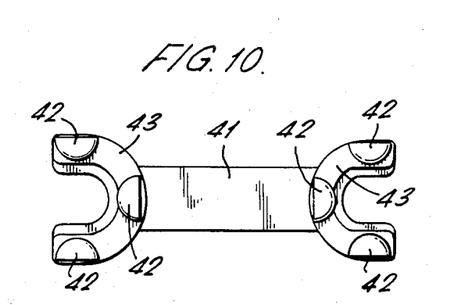

Referring now to FIGS. 9 and 10 of the drawings, the out turned flange 29 of cam member 27 of the coupling illustrated has "scallop" shaped recesses 40 around its periphery at equi-spaced locations. An open ended spanner 41 is provided having three equi-spaced projections 42 around the open-ended sockets 43 thereof to engage in the recessrs 40 of the flange 29 for turning the cam member 27 with respect to its coupling body to increase or reduce the gripping action of the collet 34 in the cam member on the tube 15 in the collet. This arrangement is applicable to all the forms of coupling body described above.

What is claimed is:

1. A tube coupling comprising a hollow body having an opening to be coupled with a tube, a collet having an annular portion having a central axis and resilient arms extending from the annular portion into the hollow body, said resilient arms being deflectable radially with respect to said central axis, a cam member, and means mounting said cam member on the body, said cam member having an internal tapered cam surface reducing in a direction extending out of the body, said cam surface being engageable with the resilient arms of the collet to compress the arms radially inwardly into engagement with the tube in the collet to hold a tube in the body, said collet being axially movable in either direction with respect to the cam member to increase or decrease the radial clamping action of the cam surface on the resilient arms against a tube encircled by the arms, and means located within said hollow body for varying additionally the compressive force applied to the collet by the cam surface of the cam member, said means being operable to adjust the position of the cam member relative to the body in the direction of the collet axis and thereby adjust the radial compressive force applied by the resilient arms to a tube within the collet.

2. A tube coupling according to claim 1 in which said cam member is movable axially inwardly with respect to said body when the cam surface of the cam member is engaged against said resilient arms.

3. A tube coupling as claimed in claim 1 wherein said mounting means includes an external screw thread on said cam member engageable in an internal screw thread in the hollow body for adjustment of the cam member with respect to the collet and means are provided on the cam member projecting outwardly of an open end of the body for turning the cam member to effect said adjustment.

4. A tube coupling as claimed in claim 3 wherein the cam member has an annular flange projecting outwardly from the open end of the body with a roughened outer surface to enable the flanged to be gripped for screwing the cam member with respect to the body to effect said adjustment.

5. A tube coupling as claimed in claim 3 wherein the hollow body is formed with an insert sleeve carrying said internal screw threads with which the extenal screw thread on the cam member is engageable.

6. A tube coupling as claimed in claim 5 wherein the insert sleeve has a radially inwardly extending flange at the inner end thereof having an inclined face around its inner periphery tapering in the inward direction of the body and with which the resilient arms are engageable to urge the arms inwardly into engagement with the tube located within the collet.

7. A tube coupling as claimed in claim 3 wherein at least one sealing ring is mounted in the body to seal with the outer surface of the tube to be inserted into the body.

8. The tube coupling as claimed in claim 7 wherein said at least one sealing ring is trapped by a shoulder in the hollow body facing towards the open end thereof and the ends of the resilient arms of the collet.

9. A tube coupling as claimed in claim 8 wherein a floating ring is disposed between the said at least one sealing ring and the resilient arms, the ring having side faces which converge towards the inner periphery of the ring with which the sealing ring and ends of the resilient arms respectively engage.

* * * * *